United States Patent [19]
Williams

[11] 3,875,560
[45] Apr. 1, 1975

[54] MONITORING SYSTEM

[75] Inventor: Don W. Williams, Elida, Ohio

[73] Assignee: Floren Klopfenstein, Fort Wayne, Ind.

[22] Filed: May 10, 1973

[21] Appl. No.: 359,205

[52] U.S. Cl. ............... 340/80, 307/284, 315/77, 340/85
[51] Int. Cl. ............................................. B60q 1/26
[58] Field of Search...... 340/52 R, 67, 79, 80, 81 R, 340/81 F, 82, 83, 251, 331, 85, 52 D, 52 E, 52 F; 307/284; 315/77, 82

[56] References Cited
UNITED STATES PATENTS

| | | | |
|---|---|---|---|
| 1,622,932 | 3/1927 | Warburton et al. | 340/80 X |
| 1,747,093 | 2/1930 | Weinbrunn | 340/56 X |
| 2,127,887 | 8/1938 | Rayburn | 340/79 X |
| 2,835,880 | 5/1958 | Daws | 340/67 X |
| 3,355,708 | 11/1967 | Perry | 340/251 X |
| 3,474,410 | 10/1969 | Ivec | 340/82 |
| 3,500,312 | 3/1970 | Stankovich | 340/67 |
| 3,516,058 | 6/1970 | Sanchez et al. | 340/52 R |
| 3,517,382 | 6/1970 | Stein et al. | 340/57 |
| 3,702,459 | 11/1972 | Bauchan | 340/71 X |
| 3,735,343 | 5/1973 | Lane et al. | 340/52 A |

*Primary Examiner*—John W. Caldwell
*Assistant Examiner*—Marshall M. Curtis
*Attorney, Agent, or Firm*—Albert L. Jeffers;gers M. Roger M. Rickert

[57] ABSTRACT

A system for monitoring the operational status of lamps remote from the view of a vehicle operator is disclosed comprising a visual indicator and means coupling a source of electrical energy to the lamp to be monitored which is responsive to the contemporaneous application of voltage to the coupling means and flow of current therefrom to the lamp to energize the monitor. In a preferred embodiment a plurality of monitor lamps are provided on an automobile dash board to provide the driver with visible indications indicating whether corresponding turn and brake lights are properly operating.

4 Claims, 5 Drawing Figures

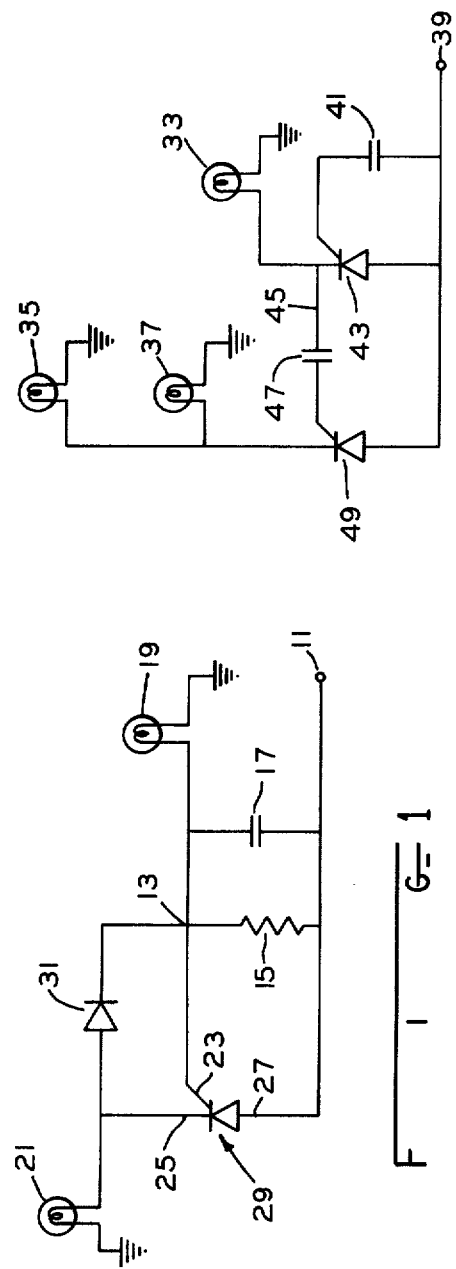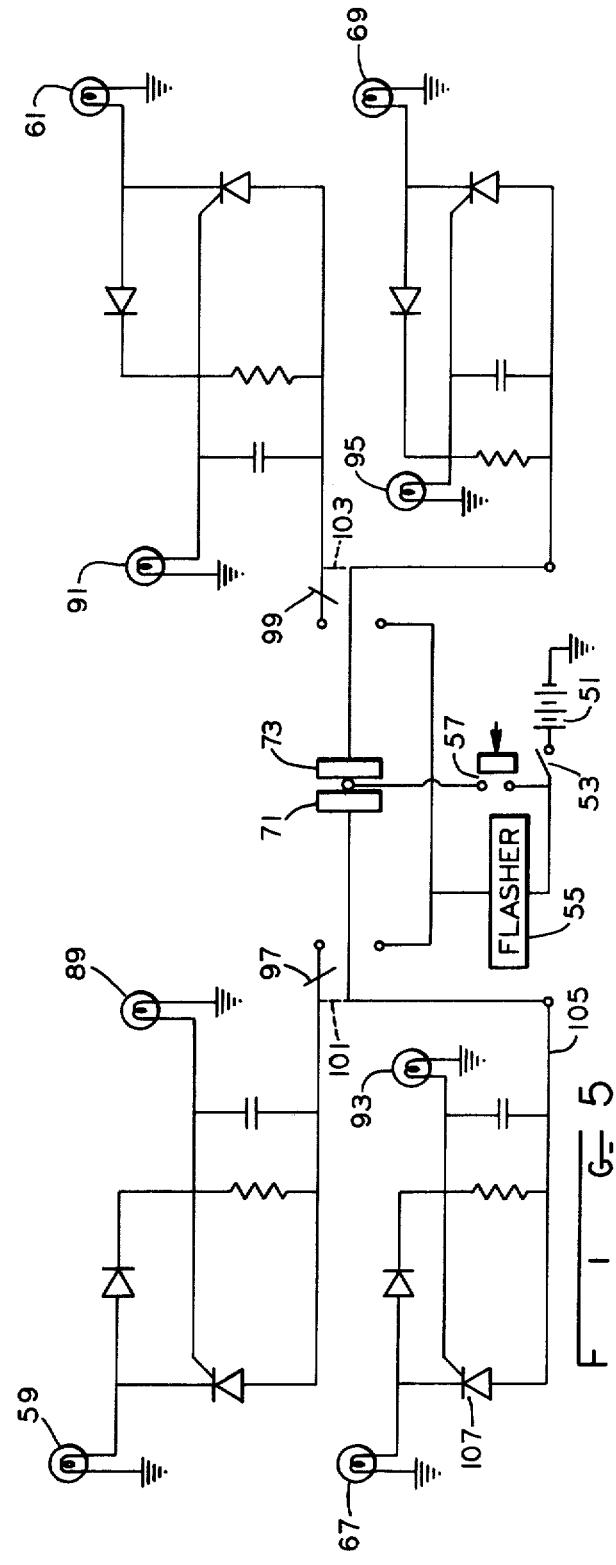

MONITORING SYSTEM

BACKGROUND OF THE INVENTION

The present invention relates to remote monitoring systems and more particularly to such a system for monitoring a vehicle lighting system to provide the vehicle operator with a visible indication of the operation of the exterior vehicle lighting system without requiring the vehicle operator to leave the vehicle and visually inspect the several exterior lights.

The general state of the vehicle lighting art and more particularly the automobile lighting art is briefly summarized in U.S. Pat. No. 3,350,684 to Turner wherein the improvement in that patent resides in an adaptor plug to be inserted intermediate existing plugs within the lighting system to provide for the energization of the front turn signal lamps simultaneous with the energization of corresponding rear brake lights. The present invention can be adapted to existing automobiles by this same general type of adaptor plug approach including, however, certain circuit components within the adaptor.

The aforementioned U.S. Pat. No. 3,350,684 acknowledges the desirability of providing an interior indication to the vehicle operator of the status of his exterior lighting system; however, this patent does not provide a means for accomplishing such a light monitoring but rather only provides an indication that a voltage is being supplied to those exterior lights.

It is also known in the prior art to provide a system of fiber optics communicating between the automobile dash and the several light locations to thereby provide a "piping" of the exterior light to the interior for monitoring purposes.

In view of the foregoing it is one object of the present invention to provide an electrical system for monitoring the actual energization and de-energization of the exterior vehicle lights.

It is another object of the present invention to provide a remote indication of the operation of a lamp.

It is a further object of the present invention to provide a circuit intermediate a lamp and a selectively energizable source of energy for that lamp which circuit indicates actual utilization of the energy by the lamp.

SUMMARY OF THE INVENTION

The foregoing as well as numerous other objects and advantages of the present invention are achieved by providing a circuit coupling a source of electrical energy to a lamp, the circuit including operator actuable switch means for selectively energizing and de-energizing the lamp and means responsive to the contemporaneous actuation of the switch and a flow of current through the lamp to provide a visible indication of proper lamp operation. In one preferred embodiment, the circuit includes a silicon controlled rectifier having its cathode connected to the lamp to be energized and its anode coupled by way of the switch to a source of electrical energy with impedance means coupling the gate and anode of the silicon controlled rectifier and an indicator lamp coupled by way of a diode to the cathode of the silicon controlled rectifier.

It is therefore still another object of the present invention to provide an entirely electronic lamp monitoring system.

The subject matter which I regard as my invention is particularly pointed out and distinctly claimed in the concluding portion of this specification. My invention itself, however, together with further objects and advantages thereof, may best be understood by reference to the following description taken in conjunction with the accompanying drawing.

BRIEF DESCRIPTION OF THE DRAWING

FIG. 1 is a schematic diagram of a single lamp status indicator according to the present invention;

FIG. 2 is a schematic diagram of a circuit utilizing existing dash board turn signal indicator lamps to provide an indication of the status of corresponding brake lights;

FIG. 5 illustrates in schematic form two possible modifications of the prior art turn signal circuit of FIG. 3 in accordance with the teachings of FIG. 1.

DESCRIPTION OF THE PREFERRED EMBODIMENT

Figure 3:
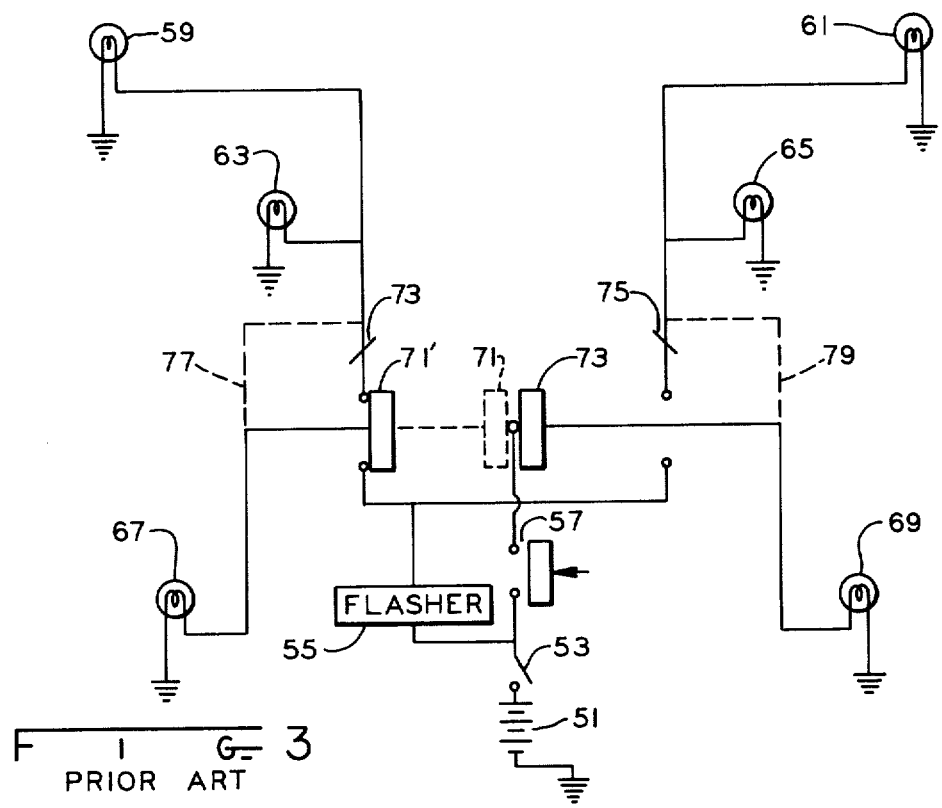
FIG. 3 illustrates in schematic form a typical prior art turn signal and brake light circuit.

In the several schematic diagrams single lamps have indicated for left and right turn signals or brake lights, however, it should be understood that many vehicles will have multiple lamps simultaneously energized in these positions and that the term lamp or light is intended to encompass one or several lamps in a given indicating position. The circuit of FIG. 1 illustrates a single lamp 21 which is not visible to an operator and an indicator lamp 19 which will reflect the actual status of the lamp 21 to the operator when that operator appropriately energizes the terminal 11.

In FIG. 1 if the voltage at 11 suddenly goes from 0 volts to for example 12 volts, the potential at point 13 will initially instantaneously jump to 12 volts due to the initial unobstructed conduction through the capacitor 17 and then exponentially decay to some steady state value as determined by the relative values of the resistor 15 and the remaining effective resistances between the terminal 11 and ground. If lamp 21 is operative, a current flow between the gate 23 and cathode 25 of the silicon controlled rectifier 29 will cause the silicon controlled rectifier to conduct from the terminal 11 through its anode 27 and its cathode 25 and through the lamp 21 to ground thus maintaining the lamp 21 energized until the voltage supplied at point 11 is removed. Lamp 19 will also be energized in parallel with lamp 21 by way of the diode 31. If, on the other hand, lamp 21 is defective and open circuited, no gate to cathode current will flow in the silicon controlled rectifier 29 and thus that silicon controlled rectifier (SCR) will remain in its nonconducting state. The initial surge of voltage at the point 13 may initially energize the lamp 19, however, the relative resistances of the lamp 19 and resistor 15 are such that the steady state current flow through the resistor 15 is inadequate to energize the lamp 19. If lamp 21 were to be removed or to burn out after application of the positive potential to the terminal 11 the sustaining current through SCR 29 would be maintained by way of diode 31 and lamp 19 to ground, however, if this lamp 21 is absent from the effective circuit at the time of application of the positive potential to terminal 11 there can never be any effective triggering current between gate 23 and cathode 25 of the SCR. Thus the circuit of FIG. 1 provides an effective monitoring lamp 19 which is energized if and only if the lamp 21 is energized.

The circuit of FIG. 1 may, of course, be used to provide a visual indication of the status of a lamp in virtually any environment and is in no way restricted to exterior vehicle light monitoring schemes and it should be understood that such a vehicular environment is disclosed herein as exemplary only of a preferred environment. The principles of the circuit of FIG. 1 may be applied to turn and brake lighting systems in automobiles utilizing only the dash board turn signal indicator as an electrically actuable visual indicator means as illustrated in FIG. 2. The circuit of FIG. 2, of course, corresponds to only one side of the automobile and would be repeated for the other side.

In FIG. 2, the lamp 33 represents a rear brake light and the lamp 35 represents the corresponding front turn signal light with lamp 37 being the similarly corresponding dash board turn signal indicator lamp. For example, all three lamps could correspond to, for example, the right hand side of the automobile. If a voltage such as 12 volts is suddenly applied to terminal 39 the capacitor 41 will conduct by way of lamp 33 to ground to supply a triggering gate to cathode current to trigger the SCR 43 and thereafter current flow through the SCR 43 will maintain the lamp 33 energized. Initial conduction through the SCR 43 will suddenly raise the potential on line 45 from 0 to around 12 volts and this sudden voltage change will be transmitted by way of capacitor 47 to the gate of the SCR 49 similarly triggering the SCR 49 to conduct and energize both lamps 35 and 37. If the rear brake light 33 is defective, no sustaining current can be maintained in the SCR 43 and thus no sudden change in the potential on the line 45 occurs and the lamps 35 and 37 are never energized. Since lamp 37 is a dash board indicator lamp, its inactivity when the brake light should be on will indicate a defective brake light to the operator.

The principles outlined in FIGS. 1 and 2 may be applied to virtually any existing automobile brake and turn lighting system, for example, such as the one illustrated in FIG. 3.

FIG. 3 illustrates a prior art turn and brake indicator circuit in schematic form with a source of electrical energy such as an ordinary automobile battery 51 which is coupled through an ignition switch 53 to a thermally actuated flasher unit 55 and a brake pedal actuated switch 57 which closes when the brake pedal is depressed as indicated by the arrow. The schematic of FIG. 3 illustrates a left front turn signal lamp 59, right front turn signal lamp 61, left turn signal indicator lamp 63, right turn signal indicator lamp 65, left rear brake (or stop) lamp 67, and right rear brake lamp 69. A manually actuable arm within the driver's compartment selectively moves one of the shorting contacts 71 and 73 from their central position as illustrated by 73 in solid lines and 71 in dotted lines to, for example, the position 71' where this contact connects the output from the flasher 55 to the rear brake light 67 and the front turn signal lamp 59 and turn signal indicator 63 whereupon all three lamps on the left hand side of the schematic intermittently flash as determined by the thermal flasher unit 55. When the turn signal is returned to its neutral position, contact 71' resumes the position 71 shown in dotted lines and only the two rear brake lamps 67 and 69 are connected to one of the terminals of the brake pedal switch 57. Depressing the brake pedal, of course, couples the source of energy to these two rear brake lamps.

The aforementioned prior art U.S. Pat. No. 3,350,684 teaches an improvement on the circuit of FIG. 3 wherein an adaptor plug may be used to effectively cut the leads to the front turn signal lamps 59 and 61 at 73 and 75 and to reconnect those lamps along the dotted lines 77 and 79 so that depression of the brake pedal will cause simultaneous energization of both the rear brake lights and the front turn signal lights. This is accomplished in the aforementioned patent by an adaptor plug and a similar but more sophisticated adaptor plug may be employed in practicing the teachings of the present invention or the present invention may be embodied in a vehicle as "original equipment."

Figure 4:
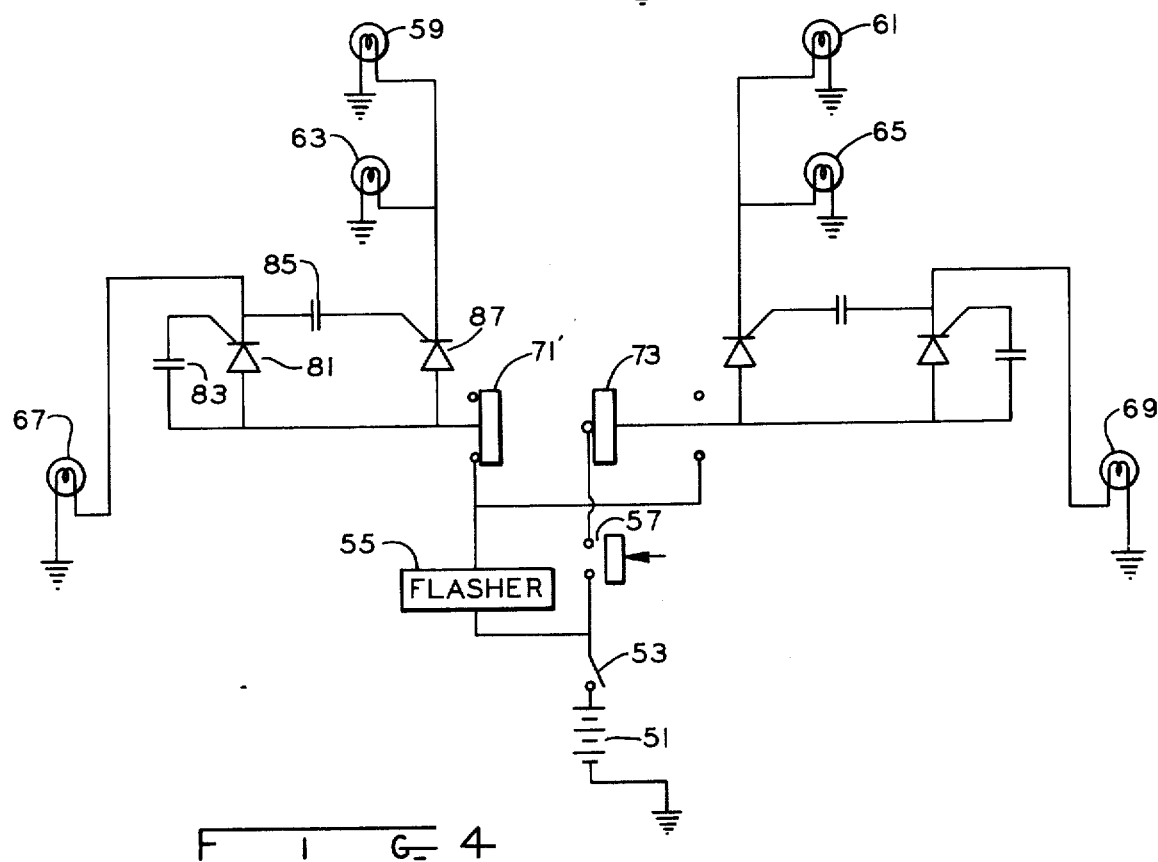
FIG. 4 illustrates in a schematic form the manner in which the circuit of FIG. 3 may be modified in accordance with the teachings of the circuit of FIG. 2 to monitor brake light status on existing turn signal indicators.

Considering now FIG. 4, elements of the prior art circuit of FIG. 3 carried over into FIG. 4 have like reference numerals. Thus the six lamps 59, 61, 63, 65, 67 and 69 characteristic of the automobile signalling system as well as flasher 55 and brake pedal switch 57, and the other elements of an automobile electrical system such as ignition switch 53 and battery 51 are all employed in this embodiment of the present invention. Similarly the turn signal switch having contacts 73 and 71' (shown in the position to indicate a left turn) may be of any known type. FIG. 4 incorporates the idea from the aforementioned patent of energizing the front turn signal light when the rear brake lights are actuated and further incorporates the circuitry of FIG. 2 so that a turn signal dash board indicator will fail to be energized in the event that a rear brake light is not properly operating.

For example, in FIG. 4 with the contacts 71 positioned as shown to indicate a left turn, energy from the battery 51, by way of switch 53 and intermittent contact flashing device 55, supplies a positive potential to the anode of silicon controlled rectifier 81 and at the same time this positive voltage is supplied to the gate of the silicon controlled rectifier 81 by way of capacitor 83. If the lamp 67 is not burned out or otherwise disconnected, the surge of voltage through the capacitor 83 will cause the silicon controlled rectifier 81 to conduct thus energizing the rear brake lamp 67 and supplying a further triggering voltage by way of the capacitor 85 to a second silicon controlled rectifier 87. So long as one of the lamps 63 and 59 is operative, the signal to the gate of silicon controlled rectifier 87 will cause it to conduct thus energizing the left front turn signal 59 and the dash board indicator 63. If, as noted earlier in the discussion of FIG. 2, the lamp 67 is burned out, no gating signal will be transmitted by capacitor 85 and no corresponding indication will appear to the driver by way of dash board indicator 63. A similar mode of operation is, of course, obtained when the operator depresses his brake pedal, however the energization of the lamps is constant rather than intermittent.

Turning now to FIG. 5 where again elements carried over from FIG. 3 bear like reference numerals, it should first be noted that the normal dash board turn signal indicator lamps 63 and 65 of FIG. 3 have been removed since their presence could give a false indication of the proper operation of the front vehicle turn signal lamps. Also turn signal contacts 71 and 73 are now shown only in their neutral position. New indicator lamps 89, 91, 93 and 95 have been provided and these could, for example be merely arranged in a row within convenient operator view and might, for example, be color-coded to aid the operator in associating a given exterior lamp with its corresponding indicator. The circuit as illustrated does not energize corresponding front turn signal lamps when the brake pedal switch 57 closes, however the circuit might be opened at 97 and 99 and closed by the corresponding dotted lines 101 and 103 to incorporate this feature. The circuit operation is substantially the same as earlier discussed in conjunction with FIG. 1 and it will be noted that FIG. 1 is basically repeated once for each external vehicle lamp. As an example of the operation of FIG. 5, if the left rear brake lamp 67 were burned out and turn signal contact 71 shifted leftwardly to indicate a left turn, the front turn signal indicating lamp 59 would be intermittently energized and the corresponding indicator lamp on the dash 89 would similarly flash, however, the pulsating voltage applied on line 105 would be unable to trigger the silicon controlled rectifier 107 due to the absence of the sustaining current path through the lamp 67 and accordingly the indicator bulb 93 would not flash in sychronism with indicator 89, thus indicating to the driver that his left rear brake light was defective.

While the present invention has been described with respect to a specific embodiment, numerous modifications will suggest themselves to those of ordinary skill in the art. Thus, while the present invention has been described primarily in reference to an automotive environment, it is equally applicable to monitoring exterior lights, for example, on an aircraft. Test switches could be easily added to test the monitor lamps. These and other modifications will readily suggest themselves and accordingly the scope of the present invention is to be measured only by that of the appended claims.

I claim:

1. In a vehicle lighting system where exterior lights out of an operator's view are selectively energizable by the vehicle operator from within the vehicle, a circuit for providing the operator with a visible confirmation that certain selected lights have in fact been energized comprising:

a source of electrical energy within the vehicle;
an exterior lamp;
an interior monitor lamp;
means coupling the exterior lamp to the energy source including operator actuable switch means for selectively energizing and de-energizing the exterior lamp; and
means responsive to the contemporaneous actuation of the switch means for energizing the exterior lamp and the flow of current through the exterior lamp to energize the monitor lamp comprising a silicon controlled rectifier having its cathode connected to the exterior lamp and its anode coupled by way of said switch means to the source of electrical energy, impedance means coupling the gate and the anode of the said silicon controlled rectifier, the interior monitor lamp being connected to the point between said impedance means and the gate of the silicon controlled rectifier, and a diode coupling the cathode of said silicon controlled rectifier to the point between the impedance means and the gate of the silicon controlled rectifier, whereby anode to cathode conduction of the silicon controlled rectifier energizes the interior monitor lamp with the anode to cathode conduction occuring only when the exterior lamp is energized.

2. The circuit of claim 1 wherein the impedance means comprises a capacitor.

3. In a vehicle lighting system where exterior lights out of an operator's view are selectively energizable by the vehicle operator from within the vehicle, a circuit for providing the operator with a visible confirmation that certain selected lights have in fact been energized comprising:

a source of electrical energy within the vehicle;
an exterior lamp;
an interior monitor lamp;
means coupling the exterior lamp to the energy source including operator actuable switch means for selectively energizing and de-energizing the exterior lamp; and
means responsive to the contemporaneous actuation of the switch means for energizing the exterior lamp and the flow of current through the exterior lamp to energize the monitor lamp comprising a first silicon controlled rectifier having its cathode connected to the exterior lamp and its anode coupled by way of the said switch means to the source of electrical energy, and impedance means coupling the gate and anode of the said first silicon controlled rectifier, and a second silicon controlled rectifier having its cathode connected to the monitor lamp and its anode coupled by way of the said switch means to the source of electrical energy, and further impedance means coupling the gate of the second silicon controlled rectifier to the cathode of the first silicon controlled rectifier.

4. The circuit of claim 3 wherein the impedance means and further impedance means each comprise capacitors.

* * * * *